Figure 1:
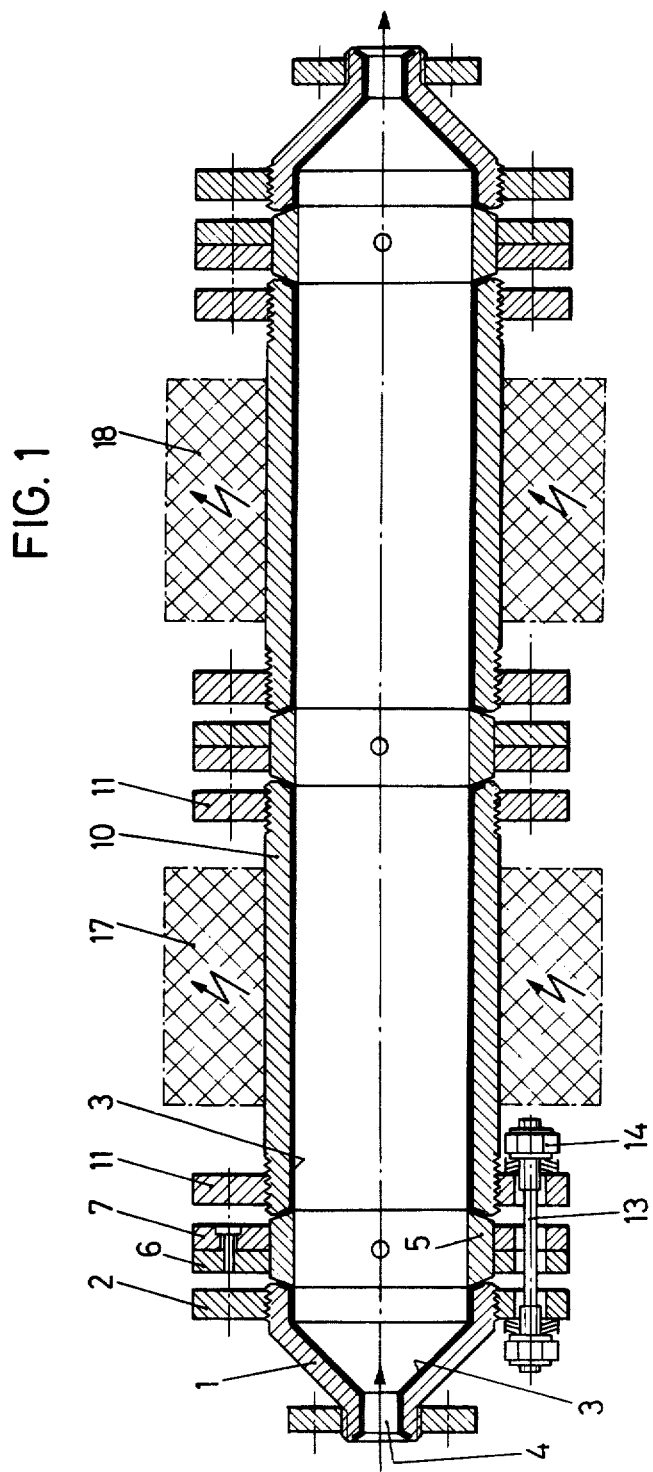

United States Patent [19]  
Walburg et al.

[11] 3,918,919  
[45] Nov. 11, 1975

[54] REACTOR FOR THE PREPARATION OF HALOGENATED COMPOUNDS FROM HYDROCARBONS

[75] Inventors: Richard Walburg, Schwalbach, Taunus; Helmut Gerstenberg, Fischbach, Taunus; Hans Osterbrink, Frankfurt am Main, all of Germany

[73] Assignee: Hoechst Aktiengesellschaft, Frankfurt am Main, Germany

[22] Filed: June 21, 1973

[21] Appl. No.: 372,018

[30] Foreign Application Priority Data
June 24, 1972 Germany............................ 2231049

[52] U.S. Cl. ................ 23/290; 23/252 A; 23/284; 23/285; 220/3; 220/5 A; 285/334.2; 285/363; 285/368; 285/414; 403/337
[51] Int. Cl.² ... B01J 3/04; C01B 9/00; F16L 21/04; F16L 58/00
[58] Field of Search ......... 23/252 R, 260, 284, 290, 23/289, 252 A; 220/3, 4 C, 5 A, 55 D; 285/334.2, 363, 368, 414; 403/336, 337; 21/93, 103

[56] References Cited
UNITED STATES PATENTS
| | | | |
|---|---|---|---|
| 922,556 | 5/1909 | Batchelder | 285/363 X |
| 1,188,530 | 6/1916 | Bosch | 23/289 |
| 2,290,333 | 7/1942 | Johnson | 285/363 X |
| 2,633,414 | 3/1953 | Boivinet | 23/290 |
| 3,472,632 | 10/1969 | Hervert et al. | 23/290 |
| 3,488,070 | 1/1970 | Amiot et al. | 285/414 X |

FOREIGN PATENTS OR APPLICATIONS
| | | | |
|---|---|---|---|
| 100,470 | 5/1910 | United Kingdom | 23/289 |
| 329,260 | 5/1930 | United Kingdom | 23/289 |

Primary Examiner—Morris O. Wolk  
Assistant Examiner—Michael S. Marcus  
Attorney, Agent, or Firm—Curtis, Morris & Safford

[57] ABSTRACT

Halogenated compounds from hydrocarbons are prepared at temperatures of from 400° to 800°C and under pressures of from 50 to 700 kp/cm². The required reactor contains several independently heated reactor units mounted in adjacent or superjacent position between which sealing elements are placed. The reactor units are provided with a nickel lining flanged at the ends, and the sealing elements consist of a nickel core with orifice and two circumferential flanged rings. The reactor units are compressed by spring-mounted expansion bolts.

6 Claims, 2 Drawing Figures

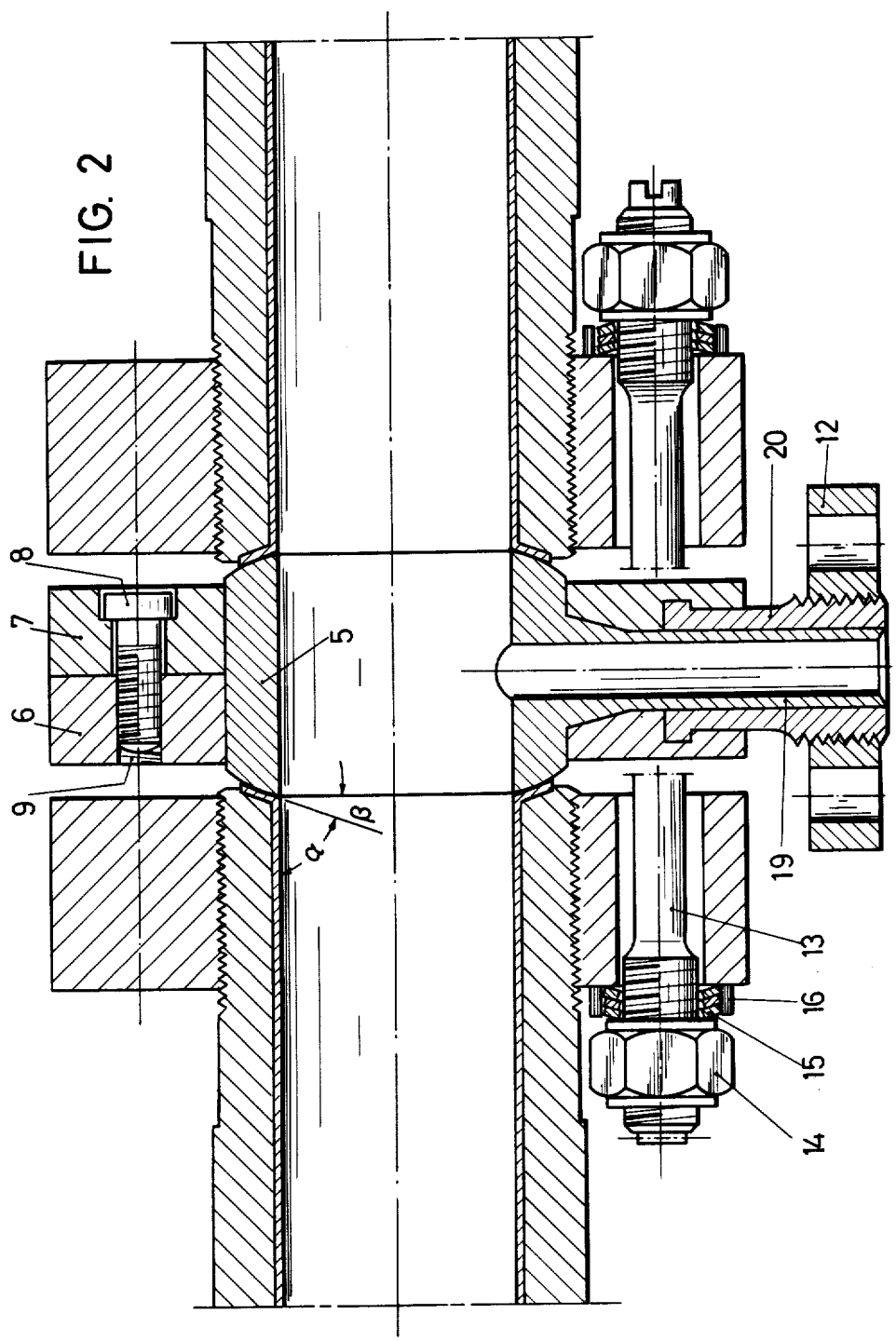

REACTOR FOR THE PREPARATION OF HALOGENATED COMPOUNDS FROM HYDROCARBONS

The present invention relates to a reactor for the preparation of halogenated compounds from hydrocarbons.

By the action of chlorine, at elevated temperatures and under elevated pressure, C—C bonds may be split. The final product of this reaction known as chlorolysis is always carbon tetrachloride. Depending on the kind of the organic substances used, other products may also be formed in this reaction. When hydrocarbons which may be entirely or partially chlorinated are used, only carbon tetrachloride is formed; when oxygen containing compounds are used, phosgen is formed in addition, and when hydrofluoric acid is used, the final product contains fluorinated chloromethanes in addition to carbon tetrachloride. All cited reactions may also be controlled in such a manner that tetrachloro-ethylene is a substantial part of the reaction product. In order to obtain economically interesting conversion rates, these reactions require temperatures of from 400° to 800° C and pressure of from 50 to 700 kp.cm$^2$. (i.e. kiloponds/cm$^2$)

The chlorine contained in the reaction mixture and the hydrogen chloride generated in nearly all these cases are extremely aggressive at the indicated temperatures. In view of the additionally required high pressure serious technological difficulties hinder the application of such reactions in industrial practice: The cited reactions generally are of a heavily exothermic kind; when benzene is reacted with chlorine to form carbon tetrachloride, for example, 53 Kcal of heat are set free per mole of carbon tetrachloride. The rapid increase of temperature causes a further heavy strain for the reactor. Above all, temperature variations occurring at the start, after completed reaction, or when the throughput is altered cannot be avoided. When the reaction gets out of control, heavy local superheating may even destroy the reactor.

For all these reasons it is quite evident that the design of the reactor is of utmost importance for the realization of the cited reactions. Because of the danger of a local damage of the reactor due to superheating for example, and for manufacturing reasons it is advantageous to assemble the reactor using several, as far as possible uniform, units between which sealing elements are placed. This increase of the number of sealing points apparently seems to be disadvantageous; but there is the advantage of designing the sealing elements in such a manner that they may contain inlets, via which either reactants not completely converted may be recycled into the reactor at a suitable point, or thermocouples for the supervision and control of the course of the reaction may be introduced. At the inlet and outlet ends of the reactor, instead of cylindrical reactor units, locking covers are mounted which contain orifices for feeding in or discharging the corresponding substances and products. Heater devices independent of each other are attached to the cylindrical reactor units, which devices permit a slow heating of the reactor before the start of the operations and a slow cooling when after completed reaction the reactor is to be opened. The lining of the reactor must be made from nickel, since substantial amounts of chlorine and hydrogen chloride are present in the reaction mixture. However, the properties of mechanical resistance of this material deteriorate rapidly with rising temperatures in the range above 400°C.

It has proved that conventional reactors do not withstand even a short-time continuous operation. Despite most careful assembly and tightness tests carried out on the hot reactor, leaks occured at the sealing elements after a short time, after a few days at the latest, and emerging hot corrosive reaction mixture caused the reactor to be damaged.

It has now been found that the cited drawbacks can be avoided by the present invention which relates to a reactor for the preparation of halogenated compounds from hydrocarbons, at temperatures of from 400° to 800°C and under pressures of from 50 to 700 kp/cm$^2$, comprising several independently heated reactor units mounted in adjacent or superjacent position, between which sealing elements are placed; wherein each of the reactor units is provided with a nickel lining flanged at the ends; the sealing elements consist of a nickel core with orifice and two circumferential flanged rings bolted together; and two neigboring reactor units each and the intermediate sealing element are compressed by means of spring-mounted expansion bolts.

It is advantageous to insert each flanged end of the nickel lining of a reactor unit in a relief of the surrounding steel jacket in such a manner that the sealing surface of the flanged end protrudes over the steel jacket to an extent of less than 20% of the total thickness of the flanged end, which percentage should not exceed 3 mm. The length of the flanged rings bolted together should be inferior to, or less than, that of the nickel core of the sealing element, measured at the exterior diameter of the nickel core, and the protrusion of the nickel core over the flanged ring should be no more than 5 mm. The orifice or the orifices and the nickel core may be one single molded piece. The springs may be centered by a bush.

The present invention will be better understood by reference to the drawings, of which FIG. 1 shows a longitudinal cross-sectional view of the reactor, and FIG. 2 represents a longitudinal cross-sectional view of two reactor units being joined by a sealing element with orifice.

Referring to FIGS. 1 and 2, the first reactor unit is the cover, which consists of a pressure-resistant body 1 made from heat-resistant steel, a flange 2 also made from heat-resistant steel screwed onto the body, a nickel lining 3 and a feed inlet 4. At the face of the lining, body 1 made from heat-resistant steel is provided with a relief as deep as to ensure the flanged nickel lining to protrude over the steel jacket to a very slight extent only. This flanged lining extends up to a diameter which is greater than the diameter of the reactor unit/sealing element tangent. The sealing element consists of a cylindrical nickel core 5, the exterior diameter of which is also somewhat greater than the diameter of the reactor unit/sealing element tangent. Nickel core 5 is enclosed by 2 flanged rings 6,7, which are bolted together by several screws 8 uniformely distributed over the perimeter; flanged ring 6 being provided with corresponding tap holes 9. In bolted state, the flanged rings have a length being somewhat inferior to the length of the nickel core, relative to the exterior diameter. Therefore, the sealing surfaces of the nickel core protrude to a slight extent over flanges 6,7. These sealing surfaces are of a slightly convexed shape, they are part of a ball cup having a large ball diameter, the centrat points of which are on the axis. The nickel linings of the reactor units each are flanged at an angle $\alpha$ which advantageously is 70°C; the tangent to the curved sealing surfaces of the nickel core is at an angle $\beta$ with the perpendicular to the axis of the reactor, which is (90° $-\alpha$), advantageously 20°.

The adjacent reactor unit is a cylindrical tube consisting of a pressure resistant body 10 made from heat-resistant steel, the ends of which body are provided with exterior taps, screwed-on flanges 11 also made from heat-resistant steel and an interior nickel lining 3 flanged at both ends. The flanged ends of the lining are inserted in reliefs in the same manner as described for the cover, that is, they protrude only very slightly over the steel jacket. These flanged lining ends of all reactor units are advantageously finely turned before assembly at the angle $\alpha$, in order to obtain plane sealing surfaces.

The reactor units and the intermediate sealing element are compressed by expansion bolts 13 and nuts 14 which are uniformely distributed over the perimeter. Expansions bolts and nuts are made from heat-resistant steel. Between flanges 2,11 and nuts 14, one or more cup springs 15 made from heat-resistant spring steel are mounted. Preferably, several cup springs are mounted below each nut, which springs are advantageously centered in bushes slipped onto them.

The cylindrical reactor units are provided with independent heaters 17,18, preferably designed in the form of electric heaters applied to the jacket.

The arrangement as described is repeated in accordance with the length of the reactor either once or several times.

According to FIG. 2, nickel core 5, for example, is joined to an orifice 19 also made from nickel and arranged vertically to the core. Nickel core 5 and orifice 19 may be advantageously manufactured from one single rough casting. Orifice 19 is surrounded by a space tube 20 made from heat-resistant steel, which on its face directed to the center of the reactor is provided with a cylindrical lug having a larger diameter. Both flanged rings 6,7 are provided with a relief which supports space tube 20 and prevents its slipping off. On the face turned off the center of the reactor, space tube 20 is provided with an exterior tap and bears a flange 12 on it. Of course it is possible to provide several orifices in accordance with the design as described for the sealing elements.

Using a reactor in accordance with the present invention, it was possible for the first time to carry out safely reactions of the aforementioned kind with high space-time yields.

The following example illustrate the invention.

EXAMPLE 1

The reactor comprises a series of units which, for reasons of restricted space, are arranged in the form of an hairpin. Three straight reactor units each contain two units having a length of 5.5 m, which are connected by two units designed in a curvature of 180°. The locking covers are the first and the last reactor units. Between all units, sealing elements are mounted. The total length of the reactor is 38 m. The inner width of all tubes (inside diameter of the nickel lining) is 104 mm. The sealing elements have a length of 100 mm (length of the nickel core at the diameter of the sealing circle) and have also an inner width of 104 mm. Every sealing element is provided with a thermocouple. Two adjacent reactor units each and the intermediate sealing element are compressed by eight expansion bolts. Three cup springs each, made from high-temperature resistant steel, are placed below all nuts. The straight reactor units are provided with electric heaters fitting the jacket of the pressure-resistant steel tube, which heaters are insulated at their exterior faces.

The following temperatures are adjusted by means of the electric heaters: 400°C for the first 5 m of reactor tube length, 500°C for the subsequent 5 m, and 580°C for the remaining reaction zone.

Under a pressure of 90 kp/cm$^2$, the following amounts are introduced by means of high-pressure pumps into the reactor so heated: 660 kg/h of chlorine, 495 kg/h of a hydrogen-deficient chlorohydrocarbon mixture, 87.5 kg/h of dichloro-ethane. The hydrogen-deficient chlorohydrocarbon mixture contains residues obtained in the chlorination of methane to carbon tetrachloride, the hydrogen content of which is about 0.02%. The main components are 45.2 weight % of hexachloro-ethane, 36.1 weight % of carbon tetrachloride, and 13.8 weight % of perchloro-ethylene, as well as small amounts of trichloroethylene and pentachloro-ethane. The starting products, before introducing them into the reactor, are heated to the following temperatures: chlorine 150°C, methane chlorination residue and 1,2-dichloro-ethane 50° - 60°C.

Without adding a further auxiliary, the reaction proceeds as an exothermic one. Inside the reactor, the chlorohydrocarbons or carbon chloride compounds reacted are chlorolysed to such an extent that the mixture of carbon tetrachloride, hydrogen chloride and non-reacted chlorine which leaves the reactor contains about 1 to 2 weight % of hexachloro-ethane and hexachloro-benzene, relative to the carbon tetrachloride formed.

EXAMPLE 2

Under an inside pressure of 200 kp/cm$^2$ the following amounts are introduced by means of high-pressure pumps into the reactor described in Example 1: 78 kg/h of a residue from the manufacture of vinyl chloride, and 435 kg/h of chlorine. The residue contains 28.9% of carbon, 3.9% of hydrogen, and 67.2% of chlorine. The main components are 49.2 weight % of 1,2-dichloro-ethane, 16.6 weight % of 1,1,2-trichloroethane, 7.5 weight % of monochloro-benzene, and 10 weight % of dichloro-butene. The starting temperature of 50°C is maintained by preheating the chlorine.

After a short starting period, the reaction mixture attains a temperature of from 580° to 620°C.

The mixture of carbon tetrachloride, hydrogen chloride and non-reacted chlorine leaving the reactor contains from about 1 to 3 weight % of hexachloro-ethane and hexachlorobenzene, relative to the carbon tetrachloride formed.

What is claimed is:

1. A reactor for the preparation of halogenated compounds from hydrocarbons, at temperatures of from 400° to 800°C. and under pressures of from 50 to 700 kp/cm$^2$ comprising a plurality of cylindrical reactor units, said reactor units having internal bores and being aligned on a common longitudinal axis with said internal bores in axial alignment with each other; a sealing element positioned between and connecting the adjacent ends of each of said aligned reactor units; said sealing element comprising a nickel core having an internal bore located generally in alignment with the bores of its adjacent reactor units; each of said reactor units having a nickel lining on their respective internal bores, said lining extending beyond the end portions of the reactor units and being flanged over at least a portion of their associated reactor unit end portions; two circumferential flanged rings bolted together surrounding said sealing element in a plane perpendicular to the axis of its bore to reinforce said sealing element, said reactor units being independently heated and having radially extending circumferential flanges secured thereto adjacent their respective end portions, a plurality of expansion bolts extending through all of said flanges, and spring means cooperating between said flanges and said bolts for compressing said sealing element between the flanges of said nickel lining.

2. A reactor as claimed in claim 1, wherein said reactor units are formed as steel jackets and each flanged end of the nickel lining of a reactor unit is inserted in a relief of the surrounding steel jacket in such a manner that the sealing surface of the flanged end protrudes over the steel jacket to an extent of less than 20% of the total thickness of the flanged end, which percentage corresponds to a maximum of 3 mm.

3. A reactor as claimed in claim 1, wherein the length of the flanged rings bolted together is less than that of the nickel core of the sealing element, measured at the exterior diameter of the nickel core, and the protrusion of the nickel core over the flanged ring is no more than 5 mm on each face.

4. A reactor as claimed in claim 1, wherein the nickel core and the orifice of the sealing elements are manufactured from one single piece.

5. A reactor as claimed in claim 1, wherein the springs are centered in a bush.

6. A reactor as claimed in claim 1 wherein said sealing element has a generally radially extending orifice formed therein to provide access to the internal bore thereof.

* * * * *